United States Patent [19]

Labib et al.

[11] Patent Number: 4,532,074
[45] Date of Patent: Jul. 30, 1985

[54] CAPACITANCE ELECTRONIC DISC MOLDING COMPOSITION

[75] Inventors: Mohamed E. Labib, Princeton; Chin-Chun Wang, Mercer County; Robert F. Poll, Franklin Township, Somerset County, all of N.J.

[73] Assignee: RCA Corporation, Princeton, N.J.

[21] Appl. No.: 622,646

[22] Filed: Jun. 20, 1984

Related U.S. Application Data

[63] Continuation-in-part of Ser. No. 549,560, Nov. 7, 1983, abandoned.

[51] Int. Cl.³ .............................................. H01B 1/06
[52] U.S. Cl. .................................... 252/511; 524/495; 524/496; 369/288; 428/64; 428/65
[58] Field of Search ................ 252/511; 524/495, 496, 524/567, 569, 568; 523/174; 358/342, 344; 369/126, 280, 276, 288; 428/64, 65; 264/105

[56] References Cited

U.S. PATENT DOCUMENTS

| | | | |
|---|---|---|---|
| 4,069,192 | 1/1978 | Monte et al. | 260/37 |
| 4,087,402 | 5/1978 | Monte et al. | 260/42.14 |
| 4,207,245 | 6/1980 | Halbert | 260/429.5 |
| 4,228,050 | 10/1980 | Martin et al. | 524/495 |
| 4,235,990 | 11/1980 | DiGiacomo et al. | 528/287 |
| 4,237,061 | 12/1980 | Johnson | 260/429 |
| 4,355,062 | 10/1982 | Wang et al. | 64/428 |
| 4,374,760 | 2/1983 | Charles | 252/518 |
| 4,378,310 | 3/1983 | Datta et al. | 252/511 |
| 4,383,961 | 5/1983 | Nyman et al. | 264/107 |
| 4,384,055 | 5/1983 | Okuda et al. | 524/496 |
| 4,390,459 | 6/1983 | Koral et al. | 252/511 |
| 4,416,807 | 11/1983 | Datta et al. | 252/511 |
| 4,430,460 | 2/1984 | Martin | 252/511 |

OTHER PUBLICATIONS

Williams & Wang, RCA Review, vol. 43, pp. 224–227, Mar. 1983.
Bulletin No. KR-0278-7, Rev. #2, KenReact Reference Manual, Kenrich Petrochemicals, Inc., w/1981 Supplement.

Primary Examiner—Josephine L. Barr
Attorney, Agent, or Firm—Birgit E. Morris; R. Hain Swope

[57] ABSTRACT

A conductive molding composition for the preparation of high density capacitance electronic discs is disclosed. The improved composition contains only five ingredients and is characterized by superior playback without the necessity of washing the disc after pressing. The subject compositions contain as a dispersant isopropyl tri(dioctylpyrophosphato)titanate. Preferred compositions are additionally comprised of poly(vinyl chloride), conductive carbon black, diundecyl phalthalate as a plasticizer and a tin mercaptoester or tin alkyl mercaptide stabilizer.

16 Claims, No Drawings

CAPACITANCE ELECTRONIC DISC MOLDING COMPOSITION

RELATED APPLICATIONS

This application is a continuation-in-part of U.S. patent application Ser. No. 549,560 filed Nov. 7, 1983, now abandoned.

This invention relates to an improvement in conductive molding compositions utilized to prepare high density information discs known as capacitance electronic discs ("CEDs").

BACKGROUND OF THE INVENTION

Martin et al, U.S. Pat. No. 4,228,050, discloses a complex molding composition for the compression molding of high density information records such as CEDs. This composition, in essence, comprises a thermoplastic resin, preferably a vinyl chloride-based polymer or copolymer, and sufficient finely divided conductive carbon black to provide capacitive playback of discs prepared therefrom. Typically, such compositions have a bulk resistivity of below about 500 ohm-cm at 900 mHz. The composition disclosed by Martin et al. additionally contains both liquid and solid additives such as stabilizers, lubricants, plasticizers, processing aids and the like. In addition to the function of these ingredients in the formulation, e.g. as a lubricant, the selection of each required consideration of their stability during the processing and molding of the formulation and the possibility of reactions among any two or more ingredients and/or their degradation products.

It will be readily appreciated that there are many possibilities for reactions among a large formulation such as disclosed by Martin et al. It would be advantageous to significantly reduce the number and quantity of ingredients in the Martin et al. formulation thereby reducing the potential reactions, particularly in the heat and pressure of the molding process. In accordance with the invention, there is provided an improved formulation for CEDs which contains fewer ingredients and which additionally possesses other advantages such as avoiding the need for a conventional washing step after pressing.

SUMMARY OF THE INVENTION

It has been found that the number of ingredients in a conductive molding composition for CEDs can be reduced without loss of desirable performance properties by incorporating into the formulation a dispersant consisting of an effective amount of isopropyl tri(dioctylpyrophosphato)titanate. Improved CEDs prepared from the conductive molding composition can be utilized as-pressed with conventional cleaning of the disc surface.

DETAILED DESCRIPTION OF THE INVENTION

The dispersant incorporated into the conductive molding composition for capacitive electronic discs ("CED") in accordance with this invention, i.e. isopropyl tri(dioctylpyrophosphato)titanate, has the following structural formula

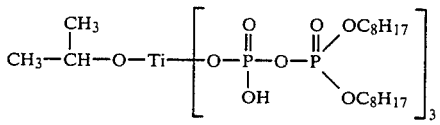

This material, available from Kenrich Petrochemicals, Inc., and many similar materials, are recommended by the manufacturer as coupling agents for filled polymers.

It is considered unexpected that the inclusion of the subject dispersant in CED conductive molding compositions allows them to be formulated with only five ingredients and without a lubricant. The complex composition disclosed by Martin et al. contains a combination of three lubricants. The advantages in thus greatly simplifying the composition in terms of potential for reactions among various ingredients and/or their degradation products or reaction products can readily be appreciated. It is further considered unexpected that CEDs prepared in accordance with this invention, as they come from the mold, are as good as or superior in performance properties to conventional CEDs which have undergone conventional cleaning and drying as disclosed in U.S. Pat. No. 4,383,961, issued May 17, 1983. The subject CEDs do not require surface cleaning after molding because they do not contain additives which have shown a tendency to bleed to the surface in prior CEDs.

The conductive molding compositions of this invention contain from about 65 to about 85 percent by weight of a suitable thermoplastic resin, from about 12 to about 19 percent by weight of finely divided conductive particles, preferably conductive carbon black, from about 1 to about 5 percent by weight of a suitable stabilizer, from about 1 to about 4 percent by weight of a suitable plasticizer and from about 0.3 to about 1.5 percent by weight of the subject titanate dispersant. Preferred compositions contain from about 78 to about 80 percent by weight of the resin, from about 15 to about 17 percent by weight of conductive particles, from about 2 to about 3 percent by weight of the plasticizer from about 2 to about 3 percent by weight of the stabilizer and from about 0.4 to about 1 percent by weight of the titanate dispersant.

The resin component of the subject molding compositions can be a homopolymer of copolymer of vinyl chloride, or a mixture thereof as disclosed by Martin et al, or an acrylic monomer, or their copolymers as disclosed by Datta et al. in U.S. Pat. No. 4,416,807, issued Nov. 22, 1983, or the like. Preferred resins are vinyl chloride-based resins, with a homopolymer of vinyl chloride being particularly preferred. A particularly suitable resin is a vinyl chloride homopolymer commercially available from B. F. Goodrich Company as BFG-346. This resin has a weight average molecular weight of approximately 84,000, a number average molecular weight of approximately 38,000 and a Tg of approximately 88° C.

Suitable conductive particles for the subject compositions are highly electrically conductive carbon blacks which have a low bulk density, i.e. about 140–160 grams per liter. Presently preferred products are Ketjenblack EC of the Armak Company and CSX-200A of Cabot Carbon Company. These products have an average particle size of about 300 angstroms, a high surface area and a high proportion of voids within the particles as measured by dibutylphthalate absorption. Other carbon blacks or conductive particles may be utilized if they meet electrical requirements, i.e. the conductivity of the finished composition must be at least 500 ohm-cm at 900 mHz. It will be appreciated, however, that the amount of carbon black to be added to the subject compositions is limited by the requirement that the composition be sufficiently pliable to have an information track compression molded therein. Generally, about 40 percent by weight of any carbon black is the maximum which can be added to the subject molding compositions.

Suitable stabilizers in accordance with this invention include organo-metallic compounds containing tin, lead, zinc, barium or cadmium, epoxides, phosphites, alkylated phenols and the like. Preferred stabilizers are tin mercaptoesters and tin alkyl mercaptides. These compounds are preferred over tin esters because they are substantially more stable than the corresponding esters in the presence of moisture. Particularly preferred stabilizers are long chain mercapto esters such as dibutyltin mercapto acetate, dibutyltin mercaptopropionate, a compound represented by the formula

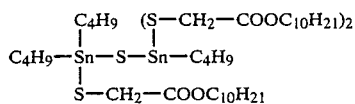

available from M & T Chemical Company under the tradename Thermolite T-133, a dibutyltin mercaptide represented by the formula

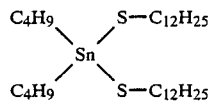

available from Argus Chemical Corporation under the tradename Mark-A, a mixed mercapto ester represented by the formula

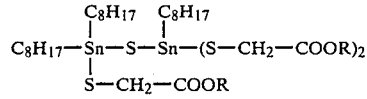

wherein R is a straight-chain alkyl radical having from 12 to 14 carbon atoms, or an alkyl mercaptide represented by the formula

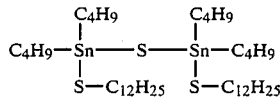

These stabilizers may suitably be used individually or in groups of two or more.

The remaining ingredient in the subject compositions is a plasticizer which may be a liquid, e.g. a low molecular weight phthalate, or a solid, e.g. glyceryl tribenzoate. A particularly preferred plasticizer in accordance with this invention is diundecyl phthalate, a liquid. In addition, the subject compositions may optionally contain up to about two percent by weight of a flow modifier as a processing aid. A presently preferred product is a solid acrylic flow modifier available from Rohm & Haas Co. under the trademark Acryloid K-175.

The conductive molding composition of this invention can be prepared by combining all of the solid ingredients in a suitable mixer, such as a Welex mixer, and thoroughly blending them. The liquid ingredients are then added thereto and the composition thoroughly mixed until the temperature reaches about 235° F. (113° C.). The composition is then extruded in a Buss Condux Kneading extruder, or other suitable apparatus, to melt the ingredients under shear. Thereafter, the composition is passed through a die, pelletized and stored for molding. High density information discs, i.e. CEDs, are prepared therefrom by compression molding at about 325°–380° F. (163°–190° C.).

In addition to the above described advantages, CEDs prepared in accordance with this invention are characterized by resistance to both hydrophobic and hydrophilic solvents, excellent lubricant spreading mobility for lubrication of the surface and excellent video and audio playback properties. The audio signal to noise ratio of CEDs prepared from the subject composition well exceeds the minimum required for stereo recording. Most important, no deterioration in these characteristics is evident after rinsing or high humidity stressing.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

A conductive molding composition was prepared by combining in a Welex mixer 79.5 parts of Geon 110×346 poly(vinyl chloride) resin of the B. F. Goodrich Company; 3.0 parts of Thermolite T-49, an organotin maleate stabilizer of the M & T Chemical Company; and 15.0 parts of CSX-200A conductive carbon black particles of the Cabot Carbon Company. The mixture was thoroughly blended. In a separate mixer, the liquid ingredients, i.e. 3.0 parts of diundecyl phthalate and 0.5 part of isopropyl tri(dioctylpyrophosphato)titanate, KR38S by Kenrich Petrochemicals, Inc., were blended until homogeneous. The homogeneous liquid mixture was sprayed onto the dry mixture in the mixer. Blending was continued until the temperature of the mixture reached 113°.

The mixture was allowed to cool to ambient and then fed to a Buss Condux Kneading extruder and melt-extruded in the form of a pelletized molding composition. Thereafter, capacitive electronic discs were compression molded from the pelletized composition.

CONTROL 1

A conductive molding composition was prepared according to the procedure of Martin et al. by mixing until thoroughly blended: 15 parts of CSX-200A carbon black; 77.5 parts of the resin of Example 1; 0.25 part of Loxiol G-30 and 0.50 part of Loxiol G-70, lubricants available from Henkel International GmbH; 1.0 part of calcium stearate lubricant; 0.75 part of Acryloid K-175, a commercially available flow modifier of Rohm & Haas Company, and 2.0 parts of Thermolite T-35 stabilizer of M & T Chemical Company. The following liquid ingredients were added to the solids with mixing: 1.0 part of dibutyltin maleate stabilizer, Mark 275 of Argus Chemical Company, and 2.0 parts of diundecyl phthalate plasticizer. Mixing was continued until the temperature reached 113°. The mixture was cooled, extrusion-melted and compression molded as in Example 1.

EXAMPLE 2

A number of the as-pressed CEDs from Example 1 and the Control batch were tested for capillary flow and spreading characteristics of a lubricant using the method described by Williams and Wang in RCA Review, Vol, 43, pages 224–227, March, 1983. The lubricant utilized for this test was the doped lubricant composition disclosed by Wang et al. in U.S. Pat. No. 4,355,062. An equal number of discs were treated and processed according to the process disclosed in U.S. Pat. No. 4,383,961, which includes washing, rinsing and drying treatments. The treated discs were also tested for lubricant spreading behavior. It was determined that, although there was not a measurable difference between the spreading mobility of the lubricant on the surface of the CEDs of Example 1, as pressed and rinsed, the as pressed discs of Example 1 had an average normalized mobility of 128 cm/second$^{\frac{1}{2}}$ as compared to 100 for as pressed Control CEDs and only 118 for rinsed Control CEDs. The surface quality of the as pressed CEDs of this invention, with regard to this determination, was judged to be demonstrably superior because of high lubricant spreading mobility and low water sensitivity.

EXAMPLE 3

For this Example and the Examples that follow, carrier distress, which is a measure of the distortion, loss of signal or dropout of the audio, video and color information coming from the CED is an important factor. The carrier distress time is measured by adding the amount of time in seconds (but discounting intervals of less than 10 microseconds) during disc playback when the r.f. output of the player arm is less than 150 millivolts peak-to-peak, and the time when the r.f. output is above 8.6 megahertz or below 3.1 megahertz in frequency, indicating a defect. Such defects are noted by the viewer as dropouts, up to a complete loss of the picture and sound information. The present acceptable level of carrier distress for a video disc is 3 seconds in one hour of playback time.

Carrier distress was determined for the as pressed CEDs of Example 1 as well as the control both as pressed and after rinsing. All discs were lubricated as in Example 2.

The discs were then subjected to a high temperature-high humidity stress by being placed in a chamber maintained at 95% relative humidity and 100° F. (37.7°) for a period of 48 hours and played again. The carrier distress measurements are set forth hereinbelow in the table.

TABLE

| | Carrier Distress (sec./hour of playback) | | |
|---|---|---|---|
| | Example 1 As Pressed | Control As Pressed | Control Rinsed |
| Virgin Play | | | |
| Median | 0.13 | 0.43 | 0.86 |
| Range | 0.09–0.85 | 0.20–6.95 | 0.18–0.62 |
| Percent >3 sec* | 0 | 33.0 | 0 |
| Post Stress Play | | | |
| Median | 0.18 | 6.11 | 1.67 |
| Range | 0.16–19.86 | 0.57–35.94 | 0.94–5.20 |

TABLE-continued

| | Carrier Distress (sec./hour of playback) | | |
|---|---|---|---|
| | Example 1 As Pressed | Control As Pressed | Control Rinsed |
| Percent >3 sec* | 17.0 | 67.0 | 33.0 |

*Present acceptable level of carrier distress.
The data presented in the Table clearly demonstrates the superiority of the CEDs of this invention.

EXAMPLE 4

Conductive molding compositions were prepared as described in Example 1 from the following formulations:

| Ingredient | Percent |
|---|---|
| Poly(vinyl chloride) | 78.5 |
| CSX-200A carbon black | 15.0 |
| Stabilizer | 3.0 |
| Diundecyl phthalate | 2.0 |
| Acryloid K-175 | 1.0 |
| Titanate KR38S | 0.5 |

The stabilizers utilized were

A. A mixed mercapto ester represented by the formula

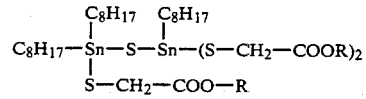

wherein R is a straight-chain alkyl radical having from 12 to 14 carbon atoms.

B. An alkyl mercaptide represented by the formula

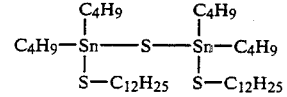

C. T-133 of M & T Chemical Company.

D. Mark A of Argus Chemical Corporation. The formulations containing stabilizers C and D contained only 0.4 percent of the titanate and 78.6 percent of poly(vinylchloride).

A total of 1000 discs were prepared from the four formulations. All discs, lubricated as in Example 2, demonstrated excellent performance properties as-pressed. Results of stability testing under high temperature, high humidity and lubricant spreading behavior in all instances met or exceeded acceptance criteria for commercial CEDs.

We claim:

1. A conductive molding composition for a capacitive electronic disc comprising: a thermoplastic resin comprising a homopolymer or copolymer of vinyl chloride; a sufficient amount of finely divided conductive carbon black to provide capacitive playback of discs prepared therefrom; from about 1 to about 5 percent by weight of a suitable stabilizer comprising an organo-metallic compound containing a member selected from the group consisting of tin, lead; zinc, barium and cadmium; from about 1 to about 4 percent by weight of a suitable plasticizer; and from about 0.3 to about 1.5 percent by weight of isopropyl tri(dioctylpyrophosphato)titanate.

2. A conductive molding composition in accordance with claim 1, wherein the composition contains from about 12 to 19 percent by weight of the conductive carbon black.

3. A conductive molding composition in accordance with claim 2, wherein the composition contains from about 15 to about 17 percent by weight of the conductive carbon black.

4. A conductive molding composition in accordance with claim 1, wherein the composition contains from about 65 to 85 percent by weight of said resin.

5. A conductive molding composition in accordance with claim 4, wherein the composition contains from about 78 to 80 percent by weight of said resin.

6. A conductive molding composition in accordance with claim 1, wherein the composition contains from about 2 to about 3 percent of said stabilizer and said stabilizer is a tin mercaptoester or a tin alkyl mercaptide.

7. A conductive molding composition in accordance with claim 6, wherein the said stabilizer is selected from the group consisting of dibutyltin mercaptoacetate, dibutyltin mercaptopropionate, a compound represented by the formula

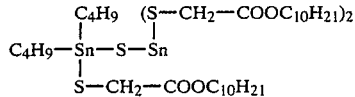

a compound represented by the formula

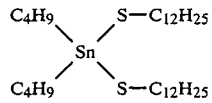

a compound represented by the formula

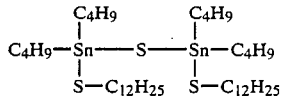

and a mixture of compounds represented by the formula

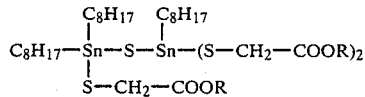

wherein R is a straight-chain alkyl radical having from 12 to 14 carbon atoms.

8. A conductive molding composition in accordance with claim 1, wherein the composition contains from about 2 to about 3 percent by weight of the plasticizer, and the plasticizer is diundecyl phthalate.

9. A conductive molding composition in accordance with claim 1, wherein the composition contains from about 0.4 to about 1 percent by weight of isopropyl tri(dioctylpyrophosphato)titanate.

10. A conductive molding composition in accordance with claim 1, wherein said composition also contains up to about 2 percent by weight of a suitable flow modifier.

11. A high density capacitance electronic disc prepared by compression molding the conductive molding composition of claim 1.

12. A capacitance electronic disc in accordance with claim 11, wherein said disc contains from about 12 to about 19 percent by weight of the conductive carbon black and from about 65 to 85 percent by weight of the resin.

13. A capacitance electronic disc in accordance with claim 12, wherein said disc contains from about 78 to about 80 percent by weight of the resin, from about 15 to about 17 percent of conductive carbon black, from about 2 to about 3 percent by weight of the stabilizer, from about 2 to about 3 percent by weight of the plasticizer and from about 0.5 to about 1 percent by weight of isopropyl tri(dioctylprophosphato)titanate.

14. A capacitance electronic disc in accordance with claim 13 additionally containing up to about 2 percent by weight of a suitable flow modifier.

15. A capacitance electronic disc in accordance with claim 11, wherein the stabilizer is selected from the group consisting of dibutyltin mercaptoacetate, dibutyltin mercaptopropionate, a compound represented by the formula

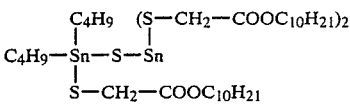

a compound represented by the formula

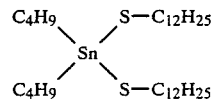

a compound represented by the formula

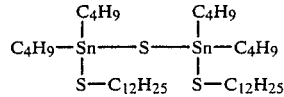

and, a mixture of compounds represented by the formula

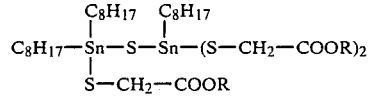

wherein R is a straight-chain alkyl radical having from 12 to 14 carbon atoms.

16. A capacitance electronic disc in accordance with claim 11, wherein the plasticizer is diundecyl phthalate.

* * * * *